United States Patent [19]

Mack et al.

[11] Patent Number: 4,603,173

[45] Date of Patent: Jul. 29, 1986

[54] PROCESSING POLYETHYLENE RESINS

[75] Inventors: Mark P. Mack; Matthew A. Page, both of Ponca City, Okla.

[73] Assignee: E. I. du Pont de Nemours and Company, Wilmington, Del.

[21] Appl. No.: 706,364

[22] Filed: Feb. 27, 1985

[51] Int. Cl.[4] ............ C08L 23/26; C08L 23/04; C08L 23/30; C08L 23/06
[52] U.S. Cl. .................. 525/194; 525/192; 525/193; 525/240
[58] Field of Search ............... 525/194, 240

[56] References Cited

U.S. PATENT DOCUMENTS 4,390,666  6/1983  Moriguchi .......... 525/194

Primary Examiner—Carman J. Seccuro
Attorney, Agent, or Firm—Cortlan R. Schupbach

[57] ABSTRACT

Polyethylene blow molding resins having improved processing properties such as reduction of flare swell and die swell are obtained by treating resins having particular molecular weight characteristics with low levels of free radical initiators. The free radical initiators are used at such low levels that the final physical properties of the resins are substantially unchanged, yet processing is greatly improved.

21 Claims, 6 Drawing Figures

PROCESSING POLYETHYLENE RESINS

This invention relates to blow molding resin compositions and methods for obtaining such compositions. More specifically, this invention relates to blow molding resin compositions having particular ratios of molecular weight fractions and which have excellent physical processing properties of high weight swell, low die swell, moderate flare swell, lower viscosity, and the like. These resins are produced by addition of low levels of free radical initiators such as peroxide to resins having particular molecular weight characteristics to provide superior processing properties while minimizing changes in physical properties.

It has long been known in the art that some polyethylene resins prepared with chromium-base catalysts have melt properties particularly suitable for use with commercial blow molding machines. Previously, some resins prepared with titanium-based catalysts have not possessed these melt properties to the same degree. The use in present commercial blow molding machinery is desirable that a polyethylene resin have a high extrusion rate associated with low die and flare swell, but moderate weight swell similar to some of the polyethylene resins prepared with chromium-based catalysts.

One such invention is described in U.S. Pat. No. 2,993,882, which teaches a two-stage process to make resins with outstanding melt properties, wherein a polymer is first prepared which is characterized by having a moderate to high level of unsaturation (i.e., 0.5 unsaturation groups per 2,000 carbon atoms). This polymer is then treated with a free radical initiator, usually a peroxide compound, to effect molecular coupling, which is defined as the condensation of the saturated portion of one polymer molecule with the ethylenic double bond of a second molecule. The coupling reaction is dependent on the existence of ethylenic double bonds (essential for coupling) and the reference teaches that no effect is seen unless a minimum amount of unsaturation is maintained. Substantial melt property changes occurred in the coupled polymer as compared to the base resin or a noncoupled resin having the same melt index.

U.S. Pat. No. 4,390,666 teaches lightly crosslinking a two-component, bimodal resin in order to improve the impact strength, improve the melt tension or melt strength of the resin, and increase the die swell of the resin. Specifically, a base resin composition having a ratio of low molecular weight material to high molecular weight material in the range of 20:80 to 95:5 is treated with a sufficient amount of free radical initiator, usually a peroxide, such that the melt index drops by a factor of between 0.03 and 0.90 of the original melt index of the base resin, and the "expansion factor" ratio increases by a factor in the range of 1.1 to 10. The "expansion factor" is a ratio (A2/A1) of the expansion factor of the crosslinked (A2) to uncrosslinked or base resin (A1). In turn, the expansion factor is itself a ratio of the intrinsic viscosity of the resin in decalin measured at 135° C. to the intrinsic viscosity of the material measured in "dioctyladipate" at 145° C. The benefits of the invention can only be obtained when this expansion factor ratio has increased by the prescribed amount.

It would be greatly advantageous to obtain a method for obtaining polymers from titanium-based catalysts which retain substantially all the physical and bottle property advantages of polymer obtained using such catalysts, while obtaining the desirable processing properties of polymers obtained from chromium-based catalysts.

It has now been discovered that these objectives can be realized utilizing a polyethylene composition obtained by lightly branching a composition having particular molecular weight characteristics comprising:

A. from 40 to 90 weight percent of a low molecular weight component (L-MW) having a viscosity average molecular weight of from about 10,000 to about 100,000;

B. from 10 to 60 weight percent of a high molecular weight component (H-MW) selected from the group consisting of
  1. a high molecular weight component (H-MW) having a viscosity average molecular weight of from about 200,000 to about 900,000, or
  2. a mixture of medium (M-MW) and very high molecular weight (VH-MW) components comprising
    (a) a medium molecular weight component (M-MW) having a viscosity average molecular weight of from about 75,000 to about 590,000 and
    (b) a very high molecular weight component (VH-MW) having a viscosity average molecular weight of from about 700,000 to about 900,000, wherein the viscosity average molecular weight ratio of $$\frac{VH\text{-}MW}{M\text{-}MW} \text{ is } \geq 1.7,$$

wherein the total resin has a density of from about 0.940 to about 0.970 and a melt index under 2.16 kilogram load of from about 0.01 to about 2.0, wherein the ratio of the expansion factor before lightly branching ($E_1$) to the expansion factor after lightly branching ($E_2$) is $E_2/E_1$ and ranges from about 0.85 to 1.06, wherein $E_1$ and $E_2$ are determined by $E=(\eta) \text{ DCL}/(\eta) \text{ EHA}$ wherein $(\eta)$ DCL is intrinsic viscosity in decalin at 135° C. and $(\eta)$ EHA is intrinsic viscosity in ethyl hexyl adipate at 165° C., wherein said light branching is carried out by combining said resins with materials imparting free radicals and heating said combination at a temperature and for a time sufficient to impart die swell reduction of at least 2 percent based on the die swell of the unbranched resin, when measured at a shear rate of 4125 sec$^{-1}$.

Preferably, the composition will contain from 60 to 90 weight percent of the low molecular weight component and from 10 to 40 weight percent of the high molecular weight component.

According to the present invention, a polyethylene composition obtained from Ziegler-Natta catalysis can be improved in processing characteristics while maintaining substantially unchanged physical characteristics. The composition is especially suitable for blow molding applications. The term "polyethylene" as used herein includes ethylene homopolymers, copolymers of ethylene and other olefins and/or dienes and mixtures thereof, wherein the density of the polymer is from about 0.935 to about 0.985 grams per cubic centimeter (g/cc). Representative but nonexhaustive examples of olefins suitable for copolymerization with ethylene include 4-methylpentene-1, pentene-1, propylene, butene-1, hexene-1, octene-1, decene-1, dodecene-1, cyclopendadiene, cyclopentene, cyclohexene, norbornene, and dienes such as 1,5-hexadiene, 1,9-decadiene, and norbornadiene. In this specification and claim, the terms "polymer" and "resin" are understood to be equivalent and are freely interchangeable.

All molecular weight values are calculated directly from intrinsic viscosity data or indirectly from the melt indices of the components using the equations and relationships described herein below. For consistency, comparisons of the molecular weights of resins are made from the intrinsic viscosity data (or calculated intrinsic viscosity data) using the equation given in U.S. Pat. No. 4,336,352.

The low molecular weight (LMW) component consists of a material with a molecular weight of about 10,000–100,000.

The high molecular weight (HMW) component consists generally of a material with a molecular weight of about 300,000–600,000 with a preferable range of 420,000–590,000. Alternatively, the HMW fraction can be made up of two components, a medium molecular weight (MMW) component and a very high molecular weight (VHMW) component, resulting in a three-component blend. Generally, the MMW component consists of a material with a molecular weight of about 80,000–295,000 and the VHMW component consists of a material with a molecular weight above about 310,000, but preferably from about 660,000 to about 900,000.

Resins (polymers) suitable for use in the present invention can be prepared by preparing the components individually followed by blending (so-called powder blending or preparing resins in parallel). A series preparation (one in which the polymer is prepared on the same catalyst particles using a succession of reactors) is preferred. Preferably, in a slurry polymerization, catalyst should be added only to the first reactor of a train and not to any successive reactor. In this way, polymer particles formed by a series reaction generally contain some of each component. Any combination of the series mode and the parallel (powder blending) mode can be used to prepare the resin, or either technique can be used individually. Polymers from either slurry polymerizations, solution polymerizations, or both, can be used.

While either homopolymers of ethylene and copolymers of ethylene with other olefins and/or dienes, and mixtures thereof, can be used, copolymers appear to be more sensitive to the process, and copolymer use is preferable when possible. It is also preferable to add the copolymer to the HMW fraction for two component resins and to the VHMW fraction for three component resins in order to optimize properties. It is known in the art that such a distribution of comonomer enhances the physical and bottle properties of the resin, such as impact strength and environmental stress crack resistance (ESCR).

The amount of unsaturated groups in the polymer (i.e., the number of double bonds between carbon atoms) has not been found to be significant in the ability of free radicals to reduce flare swell. The polymers exemplified herein generally have very low levels of unsaturation, typically about 0.1 unsaturated groups/1,000 carbon atoms as measured by infrared analysis. In contrast, the prior art requires the presence of much higher levels of unsaturation (0.25 to 2.5 unsaturated groups/1,000 carbon atoms).

Regardless of how obtained, the present invention depends upon free radicals to lightly branch the polymer composition. Such free radicals can be obtained from high energy radiation souces such as gamma or beta rays, or by the decomposition of compounds such as peroxides or azo compounds. Peroxides are the preferred source for free radicals in the present invention, whether added to the polymer composition or generated in-situ.

The compositions of the present invention are preferably formed by contacting the resin composition with less than about 1,000 parts per million (ppm) by weight of "active oxygen" of a peroxide, followed by decomposition of the initiator to form free radicals. "Active oxygen" as used herein means the weight percent free radical precursor, such as the active peroxide linkage (—O—O—), relative to the weight of the entire resin compound. Use of the term "active oxygen" thus relates to incipient free radical activity. While the term "peroxide" is used as a general term, and in the examples set forth herein, it should be clearly understood that other suitable types of free-radical initiators or free-radical generating materials can be substituted to effect rheology changes. For example, azo compounds can be used.

Very low free radical levels can be used to effect the desirable changes described in this invention. In almost all cases, less than 200 ppm by weight active oxygen is enough to lower the flare swell. Generally, less than 50 ppm by weight active oxygen is enough to obtain beneficial rheological changes, and significant processing benefits can be obtained with only 10–20 ppm by weight active oxygen.

The present invention is carried out by contacting a resin as described by E1 with a free radical initiator and heating the mixture to a temperature of from about 140° C. to about 300° C. for a time sufficient to form the resin as described by E2. The resultant ratio of E2/E1 ranges from about 0.85 to about 1.06 (wherein E1 and E2 are determined as described herein) while die swell and flare swell decreases.

In contacting the polymer with peroxide, it is desirable for the peroxide to be as evenly dispersed as possible in order to prevent the occurrence of high local concentrations of free radicals. While it would be desirable to have a perfect dispersion of peroxide or other initiator, in practice, a perfect dispersion is not possible and has been found not to be critical. Preferably, the peroxide is blended as completely as possible, but moderate blending of the peroxide with the resin has been effective. Insufficient mixing can result in a resin with improved processing properties but having other undesirable effects, such as gel formation, which reduces the commercial value of the resin.

The usefulness of any particular free radical initiator is largely determined by the decomposition temperature. If a given initiator decomposes too quickly at compounding temperatures (i.e., has too short a half-life), then the local concentration of free radicals can build up to an unacceptably high level, resulting in gel formation (crosslinked material). If the initiator decomposes too slowly at typical compounding temperature, then an amount of free radicals insufficient to effect the desired rheology changes are formed.

While it is possible to obtain the benefits of the present invention by partially decomposing initiator present in excess, it is preferable to decompose essentially all of the initiator in the sample after having added sufficient initiator to obtain the needed changes. Complete decomposition will avoid both further changes in the resin during processing and possible harmful effects on long-term physical and bottle properties which can be caused by the residual amount of unreacted initiator.

In order to completely decompose the initiator, it is best to compound the resin at a temperature such that the dwell time in the mixing or compounding unit is at least four (4) half-lives, and preferably five (5) to eight (8) half-lives. It is preferred that the dwell time not exceed more than ten (10) half-lives, and most preferably, not more than eight (8) half-lives, to avoid an excessive rate of decomposition.

Peroxides useful in the present inventions are nonexhaustively represented by dicumyl peroxide, t-butylperoxybenzoate, 2,5-dimethyl-2,5-di(t-butylperoxy)hexane, 2,5-dimethyl-2,5-di(t-butylperoxy)hexyne, and 1,3-bis(t-butylperoxyisopropyl)benzene. Other organic peroxides, hydroperoxides, diacyl peroxides, peroxyesters, azo compounds, and other organic and inorganic compounds containing a peroxide functional group that produce reactive radicals, can also be used. Mixtures of these compounds can be used. Peroxides formed in-situ are also suitable in the present invention.

In conjunction with the above-mentioned branching agents, certain auxiliary compounds can be used if desired, such as triallylcyanurate, diallylfumarate, and ethyleneglycol. These auxiliary compounds can be used alone or in mixtures.

Surprisingly, this process can be carried out in the presence of certain types of additives which suppress free radical reactions. In particular, we have found that moderate levels of antioxidants such as octadecyl-3-3',5'-di-t-butyl-4'-hydroxyphenyl propionate ("Irganox" 1076, antioxidant trademark of and sold by Ciba-Geigy Co.) can be present without significantly suppressing the beneficial effects of the process. The presence of the antioxidant does appear to suppress some undesirable concomitant oxidation reactions. U.S. Pat. No. 4,390,666 teaches that it is generally desirable to suppress side reactions caused by oxygen and keep oxygen levels low. The presence of the antioxidant helps to reduce the effect of oxygen inadvertently introduced into the compounding system.

Antioxidants which cannot be used during compounding can still be added after the compounding step by a variety of techniques. Of course, other types of additives such as antioxidants, light stabilizers, antiblocking agents, antistatic agents, pigments, organic and inorganic fillers, and the like can be added either before or during compounding, if these additives do not interfere significantly with the process, or after compounding, if so desired.

Blending equipment useful for mixing powder and additives together nonexhaustively includes ribbon blenders, intensive nonfluxing mixers such as z-blade and related double-arm mixers, and plough mixers. Compounding of the additives-powder blend can be done using batch or continuous mixers, nonexhaustively represented by single-screw extruders, double-screw extruders, intensive fluxing mixers (such as the FCM, manufactured by Farrel Corporation, U.S.A.), and kneaders. This equipment can be utilized individually or in any combination.

The rheology modifications of the present invention can be made in molding equipment. For example, free radical initiator can be added prior to the melting-extrusion-compounding step which occurs in blow molding equipment during bottle formation. The initiator decomposes in the compounding step, beneficially modifying the polymer processing characteristics.

Several techniques can be used to evaluate the effect of the light branching on the properties of the resulting resin:
1. Die swell percent test (DSP),
2. The flare swell/weight swell test.
3. The evaluation of bottles blown on commercial, intermittent extrusion equipment.

The die swell percent test is the most convenient test for evaluating the effect of peroxide on the swell properties of the resin. The test consists of measuring the diameter of an extrudate from a capillary rheometer. While the diameter can be measured in a variety of ways, the most convenient method is a laser device (such as Monsanto Chemical Company's 1200-I laser die swell detector) which continuously measures the diameter during melt extrusion of the polymer.

Since the effect of compounding variables on the two individual swell components is measured as one result (the diameter of the extrudate), the DSP test is easily and quickly carried out and is particularly useful for monitoring extrusion products.

The flare swell/weight swell test yields information about both flare swell and weight swell. In this test, melted resin is extruded through a small annular die on a capillary rheometer to form a small tube of melted resin. The flareswell is calculated by cutting the solidified tube lengthwise and measuring the circumference of the tube. The diameter of the tube can then be calculated from the circumference using the pi value. The weight swell is determined by weighing a fixed length of the tube.

Evaluation of resins by blowing bottles on commercial equipment is, of course, the most preferred way to evaluate resin, since the resin is being tested on similar equipment using similar conditions that would be used in commercial applications. Results obtained by evaluating lab resins using either the DSP test or the flare swell/weight swell test correlate well with larger quantities are tested on blow molding equipment. FIGS. 1 through 5 show the close relationship between the DSP test, the flare swell test, and the measure of flare swell on molded bottles, and the pinch-off width.

Figure 6:
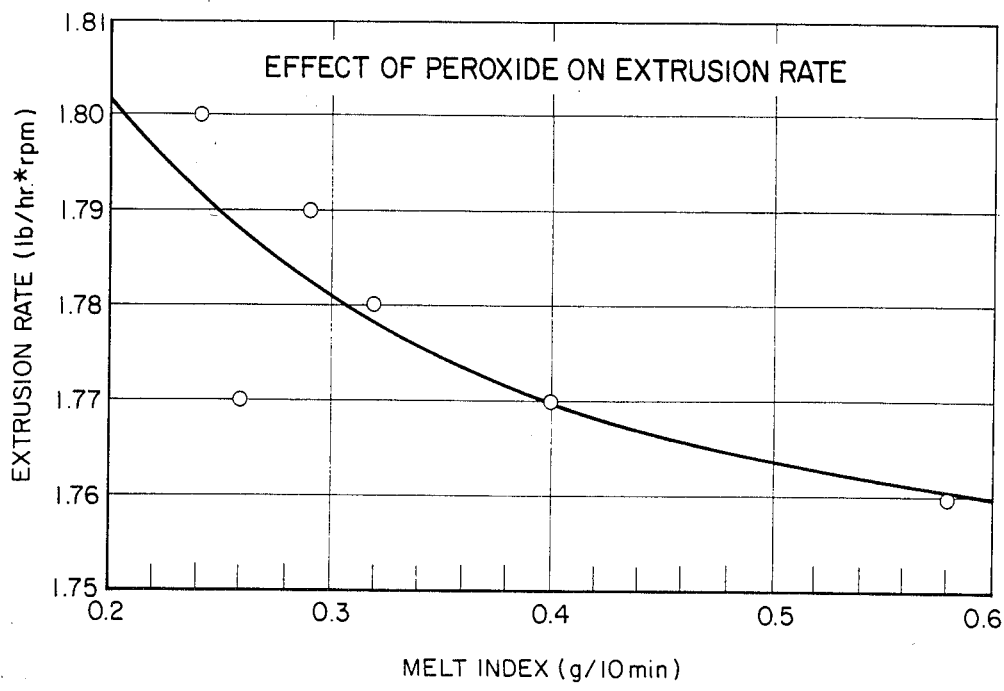
FIG. 6 illustrates the effect of peroxide on extrusion rate as measured by melt index.
Figure 1:
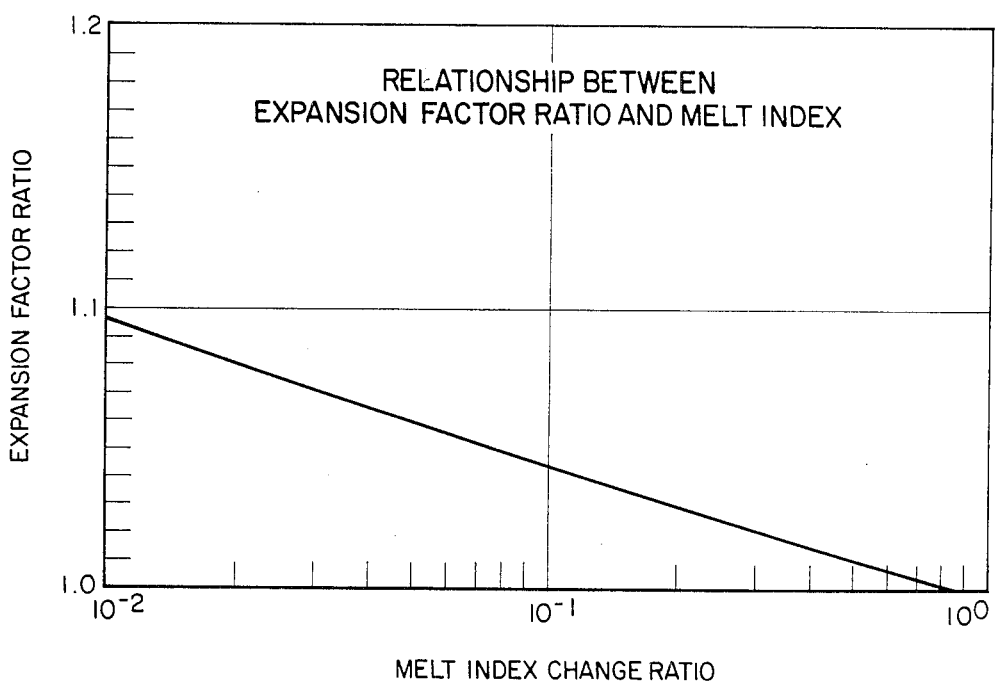
FIG. 1 illustrates the relationship between expansion factor ratio and melt index.

The examples which follow contain certain symbols and terms as well as methods for calculating values which are believed well known in the art but which are described here for convenience.

The individual components for small scale powder blends were prepared in either a 1500-pound-per-day pilot plant or in a 1.7 liter laboratory reactor. The catalyst systems used to make these materials have been described in U.S. Pat. No. 4,464,518 with the processes described in U.S. Pat. Nos. 3,392,213, 4,357,448, and 4,223,118. Two component blend powders were prepared in series in the pilot plant. Small scale experiments were run on either powder blends of individual components or else using small samples of pilot plant produced two and three component series resins.

A Brabender Plasticorder or a Haake Rheocord Torque rheometer (hereafter referred to collectively as a "lab mixer" ) was used to melt-mix resins and modify the basic resin using peroxides. A mixing head was used which contained about 45 g of polymer. The rpm level used for these experiments ranged from 25–40 while the initial temperature level ranged from 170°–200° C. A mixing time of 3–20 minutes was commonly employed in this work, sufficient to mix the resin and decompose the free-radical initiator. While it is desirable to completely decompose the initiator, it is necessary to decompose the initiator only enough to effect the appropriate die swell and flare swell reduction. The conditions used provided good mixing together with sufficient heat to decompose the peroxide. Insufficient mixing does not properly mix the components together which could result in inhomogeneous properties and even gels. Insufficient heat would not decompose the peroxide to essential completeness, which is preferable though not absolutely essential. Excessive heating of the sample can result in gels because of excessively fast peroxide decomposition. A target peroxide half-life of roughly 10–30 seconds was used. However, the present invention can be carried out with a much broader range of half-lives.

Small scale blends were prepared by combining a series blend or individual components together, along with the appropriate additives, in a small, wide-mouth polyethylene bottle. The contents were mixed either by shaking or by tumbling the bottle on a ball-mill roller mixer. Where more than one sample was needed for an experiment, sufficient powder to make all of the necessary samples was prepared at once, followed by preparation of the individual blends from this masterbatch.

Large-scale blends or samples were prepared in a 1500-pound-per-day pilot plant, in which either two or three component resins could be prepared in series. The process and catalyst systems employed in this preparation were the same as those described for preparation of small-scale blends. While powder blends can be used to make blow molding resins, preferably blow molding resins are prepared in series where catalyst is added only to the first reactor of a multiple reactor series. After the polymer has been prepared, the polymer is separated from the diluent and dried (under nitrogen) using conventional equipment.

Optionally, comonomer can be added to the resin at any stage as the primary means of density control. Comonomer is preferably added to the high molecular weight fraction in order to optimize the physical properties of the resin.

The material was compounded and pelletized using a No. 4 FCM (Farrel Continuous Mixer) intensive mixer. Additives were combined in a master-batch, then metered in with the polyethylene. In turn, this additive-polyethylene blend passed through a static mixer, into the FCM feed hopper and then into the FCM. Some liquid additives were also added directly to the FCM by a pump. The discharge from the FCM fed directly into a single screw extruder, which served as a melt pump for an underwater pelletizer.

Melt index was measured as $MI_2$ according to ASTM D-1238 under a load of 2.16 kilograms. Breadth of the polyethylene molecular weight distribution was measured as $MI_{20}/MI_2$, with larger values indicating broader molecular weight distributions. $MI_{20}/MI_2$ was obtained by dividing the value of the melt index measured under a load of 21.6 kilograms by the value obtained measuring a melt index under 2.16 kilograms.

The expansion factor ratio was obtained by obtaining intrinsic viscosities of both original untreated polymer and free radical treated polymer under two different conditions. First, intrinsic viscosity was measured in decalin at 135° C., identified as iv-DCL(135). Second, intrinsic viscosity was measured using di-(2-ethylhexyl)adipate (EHA) as a solvent at either 145° C., or at 165° C., where the polymer remains in solution and does not precipitate. These two conditions are identified as iv-EHA(145) and iv-EHA(165). The temperature measuring device was carefully calibrated to ensure the accuracy of the temperature measurement.

The expansion factor ratios are calculated as described below. Expansion factor ratio (EFR) is based on iv-EHA (145). Modified expansion factor ratio (MEFR) is based on iv-EHA (165). These designations will be used in the Examples.

In calculating EFR/MEFR, the quotient of iv-DCL/iv-EHA for both an untreated and a free radical treated resin was first determined. This ratio is described as $E_1$ for the untreated resin and $E_2$ for a peroxidized or otherwise treated resins. The EFR/MEFR was then calculated by obtaining the quotient of $A_2/A_1$ or $E_2/E_1$ as described in U.S. Pat. No. 4,390,666.

$$\text{Expansion factor ratio} = \frac{A_2}{A_1} = \frac{iv\text{-}DCL(135)/iv\text{-}EHA(145)}{iv\text{-}DCL(135)/iv\text{-}EHA(145)}$$

Modified expansion factor ratio =

$$\frac{E_2}{E_1} = \frac{iv\text{-}DCL(135)/iv\text{-}EHA(165)}{iv\text{-}DCL(135)/iv\text{-}EHA(165)}$$

where either $A_2$ or $E_2$ describes lightly branched resin from free radical treatment while either $A_1$ or $E_1$ describes essentially linear, untreated resin.

The "intrinsic viscosities" for determining the molecular weight of a given component were generally calculated from the melt index. These intrinsic viscosities are obtained from melt index data using the formula relationship:

$$\text{Log } (MI_2) = 1.5112 - 4.986 \times \text{Log } (iv\text{-}DCL)$$

This relationship was derived by a regression analysis of a plot of Log ($MI_2$) v. Log (iv-DCL) over a wide range of melt index values, producing an equation with a correlation factor of 0.933.

Alternatively, the intrinsic viscosity can be measured using ASTM D1601-78. This method is well known to those skilled in the art.

The molecular weight of each component is then calculated from the intrinsic viscosity value (either measured or calculated) by the equation mentioned in the Journal of Polymer Science, Volume 36, p. 91 (1956) and also in U.S. Pat. No. 4,336,352, namely:

$$(iv\text{-}DCL) = 6.8 \times 10^{-4} \times (MW)^{0.67}$$

The molecular weight of the components and of the blends are given as a standard way to describe each component and each blend. However, the blend composition is controlled based upon the melt indices of the individual components. To calculate the melt index of each blend, an equation given in Journal of Polymer Science, Part A, Volume 2, pp. 2977–3007 (1964) was modified as follows:

$$(\text{blend-}MI_2)^{-0.211} = \frac{L\%}{100\%}(L\text{-}MI_2)^{-0.211} + \frac{H\%}{100\%}(H\text{-}MI_2)^{-0.211}$$

This equation can be used for as many resin fractions as necessary. For a resin with three components, the equation would contain three separate additive relationships.
where
L % = weight percent of a LMW fraction
L-MI$_2$ = MI$_2$ of a LMW fraction
M % = weight percent of a medium molecular weight fraction
M-MI$_2$ = MI$_2$ of a medium molecular weight fraction
VH % = weight percent of a very high molecular weight fraction
VH-MI$_2$ = MI$_2$ of a very high molecular weight fraction Flare swell and weight swell properties were evaluated differently depending upon the size of the sample. If only a small, lab-scale sample was available, then either the flare swell percent and tube weight measurements or the die swell percent could be obtained. For the large pilot plant samples, however, the resins could be tested on commercial blow molding equipment in addition to the other two tests. This dual testing confirmed that DSP was a very good indicator of other rheological values.

The flare swell percent and tube weight values, which refer to the flare swell and weight swell parameters, respectively, were measured using a Sieglaff-McKelvey capillary rheometer. The rheometer extrudes a melted resin sample through an annular die, simulating parison formation in the blow molding extrusion process. The rheometer was interfaced to a Tektronix 4052 computer for facilitating data collection and analysis. The rheometer was operated in a constant stress mode at a melt temperature of 190° C. for all measurements.

Weight swell measurement is the thickness of the tube wall which occurs after passage of the polymer through an annular die. Flare swell is a measurement of the increase in the diameter of the tube after being extruded through an annular die. Flare swell percent and tube weights were measured on polymer tubes extruded from an annular die at shear rates above the shear rate of oscillating flow. The tubes were collected at four different shear rates. The flare swell percent at each shear rate is calculated by $$FSP\ (\%) = \frac{D_{extrudate} - D_{outer}}{D_{outer}} \times 100$$

wherein D$_{extrudate}$ is the average tube diameter and D$_{outer}$ is the outer diameter of the annulus. The tube weight is reported as the weight in grams of a 3½-inch length. Reported flare swell percent and tube weight values were obtained from a linear least square fit of the four measured swell properties versus shear rate. The flare swell percent (FSP) and tube weight (TW) are the values obtained at a standard rheometer piston velocity. These tests closely simulate the flare swell and weight swell observed in commercial processing.

The melt viscosity of the resin blends was also measured in a Sieglaff-McKelvey capillary rheometer. The viscosity 200 values (or VIS200) is the melt viscosities of the sample as measured on this rheometer at a shear rate of 200s$^{-1}$.

Die swell percent (DSP) is a measure of the diameter extrudate relative to the diameter of the orifice from which it was extruded. Values reported were obtained using an Instron 3211 capillary rheometer fitted with a capillary of diameter 0.0301 inches and length 1.00 inches. The strand diameter was measured ¼ to ½ inch below the orifice as the resin extruded using a Monsanto 1200-I laser die swell detector. DSP values are reported as percentage increase or decrease at a temperature of 190° C. and a shear rate of 4125 sec$^{-1}$.

DSP is calculated as:

$$DSP\ (190) = \frac{\text{Diameter Extrudate} - \text{Diameter Orifice}}{\text{Diameter Orifice}} \times 100$$

The flare swell and weight swell of large samples was measured by extruding bottles under standard conditions on a commercial-type intermittent extrusion blow molding machine. Bottles were prepared using a Uniloy 250R1 blow molding machine along with 2-800014 industrial gallon-handleware bottle molds. Bottles were prepared using conditions similar to those used in commercial preparations of bottles which are well known to those skilled in the art.

When considering bottle data, the weight swell is gauged by constant die gap (CDG) bottle weight. The die gap of the blow molding is set at an arbitrary standard width and bottles are prepared at conditions roughly approximate to commercial operation. The bottle weight is then measured on a balance. Those resins having a higher weight swell will have a higher bottle weight; conversely, those resins with a lower weight swell will exhibit a lower bottle weight.

The flare swell can be measured for the test parisons extruded from a Uniloy blow molding machine in two different ways:

A. The first method is by measuring the pinch-off width by setting the die gap at an arbitrary standard level and using standard operating conditions. After bottles are produced, the width of the flash at the bottom of the bottle is measured (i.e., in the direction of the diameter of the bottle). A wide "pinch-off width" indicates a higher flare swell; conversely, a narrower "pinch-off width" indicates a lower flare swell.

B. The second method of measuring the flare swell is by the photoflare technique, wherein a parison is extruded from the blow molding machine and a photograph is taken on the parison from a constant point. The photograph is then developed and the width of the parison measured. This method ensures that the "actual" flare swell or parison diameter increase is measured, without complications from drawdown or parison sag, which occurs only after some period of time and are not exhibited in the 1-second time frame necessary to take the picture. Thus, a fairly accurate measure of the flare swell characteristics of the resin can be obtained.

Column crush properties (or topload strength) of bottles, produced on an intermittent blow molding machine, are measured by ASTM Method D-2659 and are reported in pounds.

Drop impact strength of bottles produced on an intermittent blow molding machine are measured by ASTM Method D-2463 and are reported in feet dropped.

Bottle stress crack resistance was measured by ASTM Method D-2561, except that a slightly higher bottle pressure was used. The values reported are F-50 values and the units are hours using bottles obtained from a continuous blow molding machine.

The invention is more concretely described with reference to the examples below, wherein all parts and percentages are by weight unless otherwise specified. The examples are provided to illustrate the present invention and not to limit it.

Example 1

A two-component sample of HDPE resin was prepared in series in a pilot plant and had the following approximate composition:

| Component | Percent Used | Melt Index $MI_2$ |
| --- | --- | --- |
| LMW | 74 | 12.5 |
| HMW | 26 | 0.01 (calc'd) |
| Target Blend $MI_2$ = 0.5 | | |
| Target Blend Density = 0.957 (g/cc) | | |

"Irganox" 1076 antioxidant was added to all of the samples prior to mixing up to a level of 250 weight-ppm as well as 500 weight-ppm of calcium stearate. Dicumyl peroxide was added to Samples 1-2 and 1-3 at the levels given in Table 1 below. Each of the three samples was mixed for approximately three minutes at 190° C. in a lab mixer. The peroxide levels and the properties obtained for each of the samples is given in Tables 1 through 4.

Example 2

The same base resin and additives used in Example 1 were used, except that t-butyl peroxybenzoate was used in place of dicumyl peroxide. The sample was also mixed using the same method as used in Example 1. This example demonstrates that the flare swell reduction ability of peroxides is fairly general and is not limited to one peroxide, or even one class of peroxide (dicumyl peroxide is a dialkyl peroxide, whereas t-butyl peroxybenzoate is a perester).

The same number of moles of active oxygen (i.e., the —O—O—linkage) was used in Example 1. Because the molecular weights are different, however, different weight ppm levels of the two peroxides were employed.

A low level of peroxide is capable of effecting the flare swell reduction needed for this product. Surprisingly, it appears that the weight swell property remains essentially unaffected by peroxide treatment. This allows the flare swell to be adjusted independently of the weight swell, which greatly simplifies the job of designing a blow molding resin.

A surprising feature of the present inventions is that the flare swell reduction takes place in the presence of antioxidants. It would be expected that antioxidants would interfere with the free radical chemistry induced by peroxide decomposition; in fact, the addition of the antioxidant appears to decrease the swell reduction by only a small amount. This minimizes the oxidative degradation which might otherwise occur during swell reduction, and results in a resin with better properties. Results are set forth in Tables 1 through 4.

TABLE 1

PEROXIDE LEVEL

| Sample | Active Oxygen (ppm) | Peroxide Weight (ppm) |
| --- | --- | --- |
| 1-1 | 0 | 0 |
| 1-2 | 5 | 42 |
| 1-3 | 25 | 210 |
| 2-1 | 0 | 0 |
| 2-2 | 5 | 30 |
| 2-3 | 25 | 152 |

TABLE 2

MELT INDEX PROPERTIES

| Sample | $MI_2$ | $MI_{20}/MI_2$ |
| --- | --- | --- |
| 1-1 | 0.60 | 73 |
| 1-2 | 0.45 | 82 |
| 1-3 | 0.42 | 94 |
| 2-1 | 50 | 55 |
| 2-2 | 46 | 51 |
| 2-3 | 41 | 44 |

TABLE 3

FLARE SWELL PROPERTIES

| | FLARE SWELL PERCENT | | TUBE WEIGHT | |
| --- | --- | --- | --- | --- |
| Sample | 2.5 cm/s | 3.5 cm/s | 2.5 cm/s | 3.5 cm/s |
| 1-1 | 46 | 50 | 1.23 | 1.28 |
| 1-2 | 46 | 46 | 1.25 | 1.26 |
| 1-3 | 32 | 35 | 1.16 | 1.20 |
| 2-1 | 50 | 55 | 1.28 | 1.34 |
| 2-2 | 46 | 51 | 1.26 | 1.32 |
| 2-3 | 41 | 44 | 1.29 | 1.35 |

TABLE 4

EXPANSION RATIO RESULTS

| Sample | iv-DCL (135° C.) | iv-EHA (145° C.) | DCL (135° C.) EHA (145° C.) | Expansion Factor Ratio |
| --- | --- | --- | --- | --- |
| 1-1 | 1.96 | 0.41 | 4.78 | — |
| 1-2 | 2.01 | 0.71 | 2.83 | 0.59 |
| 1-3 | 2.01 | 0.38 | 5.29 | 1.11 |

Example 3

A two-component blend was prepared using single-component powder blendstocks to make the following approximate composition:

| Component | Percent Used | Melt Index |
| --- | --- | --- |
| LMW | 65 | 14.1 |
| HMW | 35 | 0.022 |

The HMW component was a ethylene/1-butene copolymer having a density of about 0.9304 g/cc. The overall density of this material was 0.9555 g/cc. Approximately 250 weight-ppm of "Irganox" 1076 antioxidant was mixed with the powder blend. This powder mixture was then mixed in a lab mixer for eight minutes using standard conditions.

2,5-Dimethyl-2,5-di(t-butylperoxy)hexane was added at a 50 weight ppm level to one of the samples while the other sample served as an untreated standard. The rheological property data and expansion factor data are given in Tables 5 through 7.

Example 4

A two-component blend was prepared using homopolymer single-component powder blendstocks to make the following approximate composition:

| Component | Percent Used | Melt Index |
|---|---|---|
| LMW | 55 | 14.1 |
| HMW | 45 | 0.057 |
| Target Melt Index = 0.54 | | |

Approximately 250 weight-ppm of "Irganox" 1076 antioxidant was added to the powder mixture. Two samples of this powder blend were mixed in a lab mixer under standard conditions for about eight minutes. 2,5-Dimethyl-2,5-di(t-butylperoxy)hexane was added at a 50 weight-ppm level to one of the two samples prior to mixing while the other sample served as an untreated sample. Tables 5 through 7 show the resulting rheological and expansion factor data.

Example 5

A three-component HDPE resin was prepared by blending together three single-component powder samples to obtain the following composition:

| Component | Percent Used | Melt Index |
|---|---|---|
| LMW | 64 | 13.8 |
| MMW | 18 | 0.12 |
| HMW | 18 | 0.007 |

The three single-component blendstocks were all homopolymers.

The resultant powder blend was combined with 250 weight-ppm of "Irganox" 1076 antioxidant and 500 weight-ppm of calcium stearate. Samples were mixed in the same general way as Example 1 except that the total mixing time was 10 minutes. In this example, 2,5-dimethyl-2,5-di(t-butylperoxy)hexane was employed as the peroxide initiator. Rheological and expansion factor data are given in Tables 5 through 7.

Example 6

A three-component sample was prepared having an HMW fraction which was a 1-butene/ethylene copolymer. The approximate composition of this sample was:

| Component | Percent Used | Melt Index |
|---|---|---|
| LMW | 64 | 14.1 |
| MMW | 18 | 0.14 |
| HMW | 18 | 0.022 |
| Target Blend MI$_2$ = 0.825 | | |

Two hundred and forty ppm of "Irganox" 1076 antioxidant was added to the powder blend. The density of the blended sample was 0.9604 g/cc. These samples were mixed in a lab mixer for 8 minutes total mixing time using the standard conditions (180° C.; 40 rpm). Two levels of peroxide were studied. The rheological and expansion factor data are given in Tables 5 through 7.

Example 7

A two-component resin was prepared in the pilot plant having the following approximate composition:

| Component | Percent Used | Melt Index |
|---|---|---|
| LMW | 70 | 17.5 (Target) |
| HMW | 30 | 0.0135 (Calc'd) |
| Blend MI$_2$ = 0.55 | | |
| Blend Density = 0.957 g/cc | | |

Essentially all of the comonomer (1-butene) that was added in order to lower the density was added to the HMW fraction. This "comonomer targeting" improves the stress crack resistance and the impact strength of the resultant product. Rheological and expansion factor results are given in Tables 5 through 7.

TABLE 5

| | PEROXIDE LEVEL AND MELT INDEX PROPERTIES | | | |
|---|---|---|---|---|
| Sample | Amount Peroxide Used (Weight-ppm) | Amount Active Oxygen (-O-O-) Used (Weight-ppm) | MI$_2$ | MI$_{20}$/MI$_2$ |
| 3-1 | 0 | 0 | 0.67 | 68 |
| 3-2 | 50 | 11 | 0.45 | 90 |
| 4-1 | 0 | 0 | 0.51 | 56 |
| 4-2 | 50 | 11 | 0.27 | 83 |
| 5-1 | 0 | 0 | | |
| 5-2 | 100 | 22 | | |
| 5-3 | 0 | 0 | | |
| 6-1 | 0 | 0 | 1.1 | 59 |
| 6-2 | 50 | 11 | 0.69 | 80 |
| 6-3 | 75 | 16.5 | 0.64 | 81 |
| 7-1 | 0 | 0 | 0.58 | 82 |
| 7-2 | 1700 | 376 | 0.05 | 538 |
| 7-3 | 3100 | 685 | 0.01 | 1,085 |

TABLE 6

| | FLARE SWELL AND WEIGHT SWELL PROPERTIES | | | |
|---|---|---|---|---|
| | FLARE SWELL PERCENT | | TUBE WEIGHT | |
| Sample | 2.5 cm/s | 3.5 cm/s | 2.5 cm/s | 3.5 cm/s |
| 3-1 | 52 | 56 | 1.19 | 1.22 |
| 3-2 | 44 | 45 | 1.25 | 1.23 |
| 4-1 | 52 | 61 | 1.30 | 1.33 |
| 4-2 | 35 | 43 | 1.26 | 1.29 |
| 5-1 | 28 | 31 | 1.14 | 1.16 |
| 5-2 | 15 | 21 | 0.93 | 0.94 |
| 5-3 | 55 | 64 | 1.31 | 1.34 |
| 6-1 | 44 | 50 | 1.13 | 1.21 |
| 6-2 | 45 | 42 | 1.17 | 1.23 |
| 6-3 | 42 | 40 | 1.17 | 1.19 |

TABLE 7

| | EXPANSION FACTOR RATIO PROPERTIES | | | |
|---|---|---|---|---|
| Sample | iv-DCL (135° C.) | iv-EHA (165° C.) | DCL (135° C.) EHA (165° C.) | MEFR |
| 3-1 | 2.089 | 0.734 | 2.846 | — |
| 3-2 | 1.926 | 0.766 | 2.514 | 0.88 |
| 4-1 | 2.274 | 0.724 | 3.141 | — |
| 4-2 | 2.022 | 0.783 | 2.582 | 0.82 |

| Sample | iv-DCL (135° C.) | iv-EHA (145° C.) | DCL (135° C.) EHA (145° C.) | Expansion Factor Ratio |
|---|---|---|---|---|
| 5-1 | 2.14 | 0.459 | 4.6623 | — |
| 5-2 | 1.95 | 0.444 | 4.3919 | 0.94 |

| Sample | iv-DCL (135° C.) | iv-EHA (165° C.) | DCL (135° C.) EHA (165° C.) | MEFR |
|---|---|---|---|---|
| 6-1 | 1.944 | 0.835 | 2.3281 | 1.00 |
| 6-2 | 1.822 | 0.754 | 2.4164 | 1.04 |

TABLE 7-continued

EXPANSION FACTOR RATIO PROPERTIES

| 6-3 | 1.880 | 0.787 | 2.389 | 1.03 |
| --- | --- | --- | --- | --- |

| Sample | DCL (135° C.) | EHA (145° C.) | DCL (135° C.) EHA (145° C.) | Expansion Factor Ratio |
| --- | --- | --- | --- | --- |
| 7-1 | 2.19 | 0.503 | 4.35 | — |
| 7-2 | 2.02 | 0.448 | 4.51 | 1.04 |
| 7-3 | 2.09 | 0.442 | 4.73 | 1.09 |

Example 8

Pilot plant produced resins were used for this Example. Samples were prepared on a scale large enough to produce bottles using commercial blow molding equipment, testing the flare swell reducing ability of peroxides on equipment generally used in commercial practice. Verification that the die swell percent test and the flare swell/weight swell test correlate to actual flare swell and weight swell behavior on commercially used blow molding equipment was made.

Large-scale samples (400- to 600-pound samples) were prepared in the compounding section of the pilot plant. This compounding section consists of a No. 4 FCM (Farrel ® Continuous Mixer manufactured by the Farrel Machinery Group, USM Corporation, a Division of USM Company) and a single screw extruder, which serves as a melt pump for an underwater pelletizer. Bottles were blown on Uniloy equipment as described.

Several samples were prepared having different additive packages. The samples, along with the conditions used to compound the material, are given below.

TABLE 8

PEROXIDE LEVELS AND TYPES[1]

| Sample | Amount Active Oxygen (ppm) | Amount Active Peroxide (ppm) | Compound Used (ppm) | Armostat 310 Antistatic Agent Level (ppm) |
| --- | --- | --- | --- | --- |
| 8-1 | 0 | 0 | 0 | 0 |
| 8-2 | 7.7 | 35 | 78 | 0 |
| 8-3 | 7.7 | 35 | 78 | 1200 |
| 8-4 | 11.0 | 50 | 111 | 0 |
| 8-5 | 11.0 | 50 | 111 | 1200 |
| 8-6 | 16.6 | 75 | 167 | 1200 |

[1]"Luperco" 101XL--45 percent "Lupersol" [2,5-Dimethyl-2,5-di(t-butyl-peroxy)-hexane] supported on calcium carbonate (trademark of and sold by Pennwalt-Lucidol).

TABLE 9

MELT INDEX PROPERTIES

| Sample | MI$_2$ | MI$_{20}$/MI$_2$ |
| --- | --- | --- |
| 8-1 | 0.58 | 82 |
| 8-2 | 0.29 | 119 |
| 8-3 | 0.40 | 98 |
| 8-4 | 0.24 | 124 |
| 8-5 | 0.32 | 105 |
| 8-6 | 0.26 | 122 |

TABLE 10

SWELL PROPERTIES

| Sample | Die Swell Percent | FLARE SWELL PERCENT 2.5 cm/sec | FLARE SWELL PERCENT 3.5 cm/sec | TUBE WEIGHT (G) 2.5 cm/sec | TUBE WEIGHT (G) 3.5 cm/sec |
| --- | --- | --- | --- | --- | --- |
| 8-1 | 67 | 53 | 56 | 1.27 | 1.31 |
| 8-2 | 60 | 39 | 44 | 1.28 | 1.33 |
| 8-3 | 65 | 45 | 49 | 1.29 | 1.34 |
| 8-4 | 62 | 40 | 43 | 1.30 | 1.33 |
| 8-5 | 64 | 44 | 48 | 1.29 | 1.35 |
| 8-6 | 64 | 43 | 45 | 1.31 | 1.34 |

TABLE 11

LARGE-SCALE TESTING ON UNILOY BLOW MOLDING MACHINE

| Sample | Peroxide Weight-ppm | Active Oxygen Weight-ppm (-0-0-) | Extrusion Rate (lb.hr rpm) | Constant Die Gap Bottle Weight (g) | Photo Flare (in) | Pinch-off Width (in) |
| --- | --- | --- | --- | --- | --- | --- |
| 8-1 | 0 | 0 | 1.76 | 125 | 4.09 | 5.76 |
| 8-2 | 35 | 8 | 1.79 | 108 | 3.74 | 5.16 |
| 8-3 | 35 | 8 | 1.77 | 113 | 4.05 | 5.33 |
| 8-4 | 50 | 11 | 1.80 | 114 | 3.62 | 5.12 |
| 8-5 | 50 | 11 | 1.78 | 116 | 3.84 | 5.21 |
| 8-6 | 75 | 17 | 1.77 | 117 | 3.79 | 5.18 |

TABLE 12

MI$_2$ CHANGE AND EXPANSION FACTOR RATIOS

| Sample | MI$_2$ Change Ratio | Expansion Factor Ratio | Modified Expansion Factor Ratio |
| --- | --- | --- | --- |
| 8-1 | 1.00 | 1.00 | 1.00 |
| 8-2 | 0.50 | NA | NA |
| 8-3 | 0.69 | NA | NA |
| 8-4 | 0.41 | NA | NA |
| 8-5 | 0.55 | 1.04 | 0.982 |
| 8-6 | 0.45 | NA | 1.025 |

Examples 8-3, 8-5, and 8-6 were carried out in the presence of an ethoxylated tallow amine antistatic agent in addition to a phenol-based antioxidant (included in all of the samples). The presence of such materials tend to hinder the flare swell reducing abilities of added peroxide. The flare swell can be restored to original levels by adding slightly more peroxide. The flare swell reduction can be performed in the presence of a wide variety of additives so that a post-blending step is not necessary.

Figure 3:
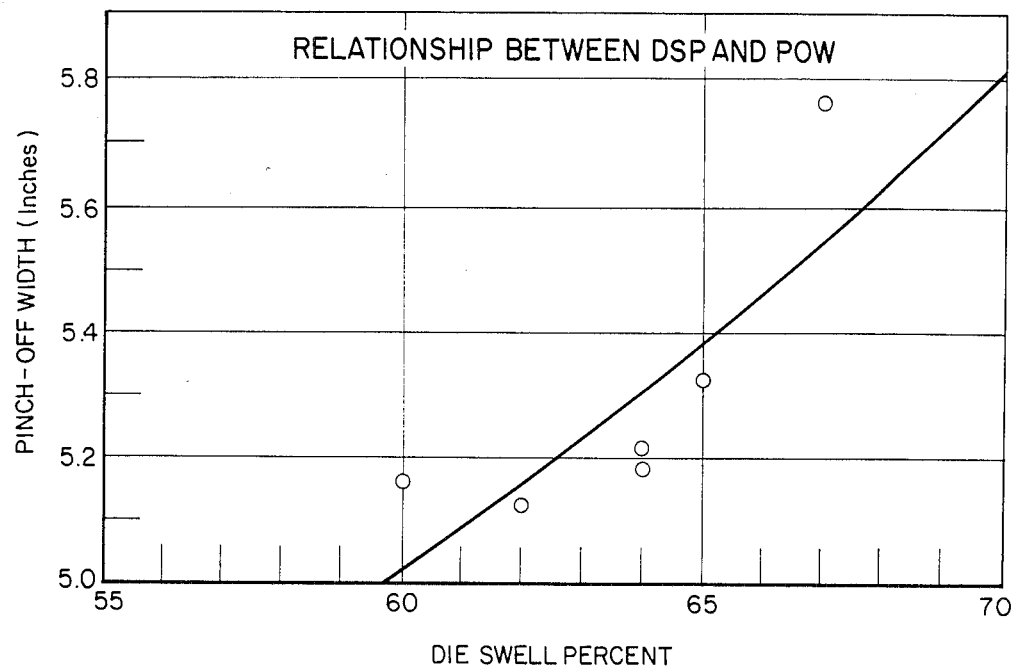
FIG. 3 illustrates the relationship between die swell percent and pinch-off width.
Figure 2:
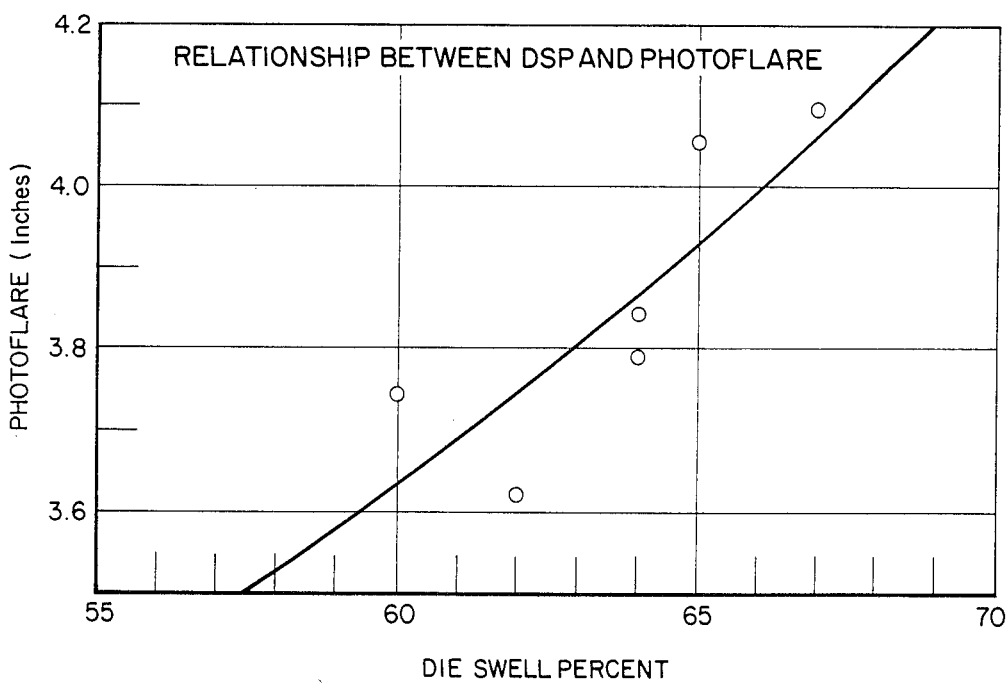
FIG. 2 illustrates the relationship between die swell percent and photoflare results.
Figure 5:
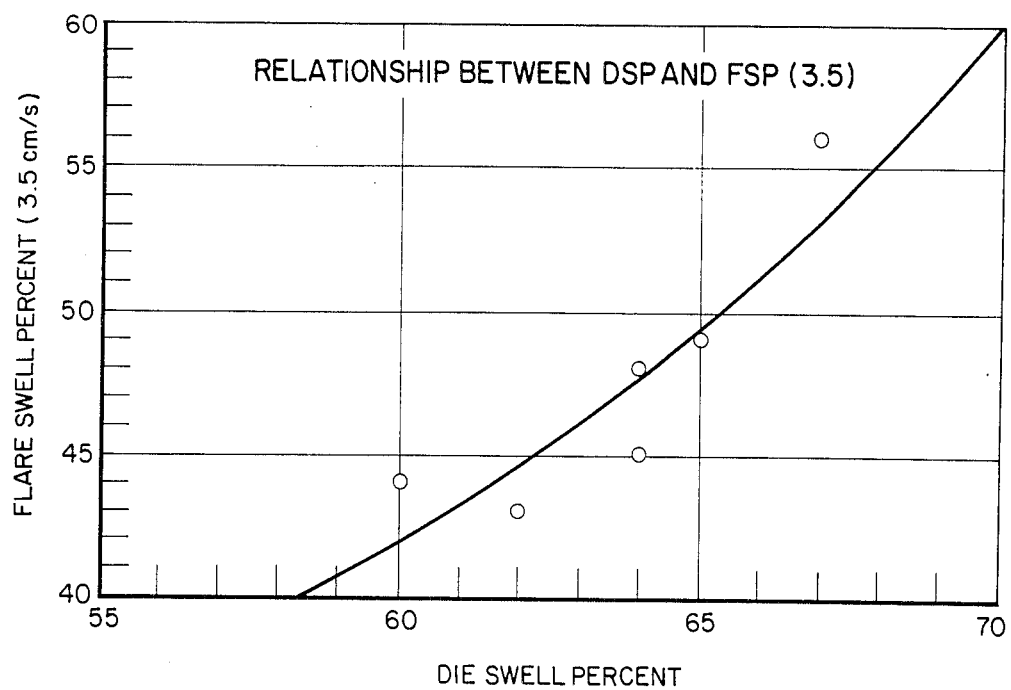
FIG. 5 illustrates the relationship between die swell percent and flare swell percent at 3.5 inches per minute extrusion rate.
Figure 4:
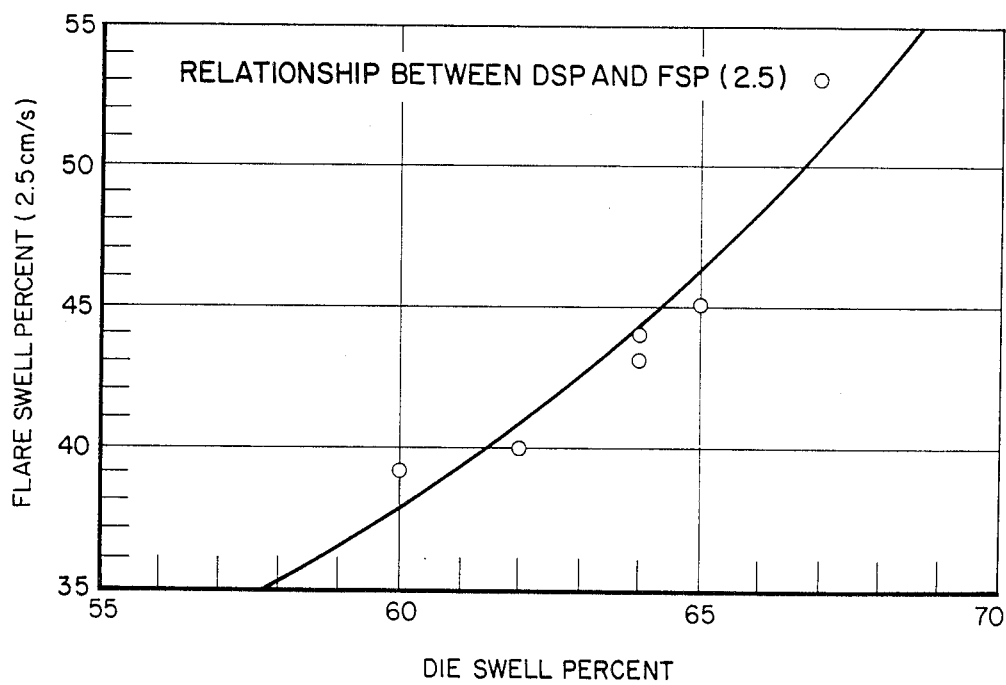
FIG. 4 illustrates the relationship between die swell percent and flare swell percent at 2.5 inches per minute extrusion rate.

This series of samples illustrates how well the DSP test predicts processing properties on a Uniloy (trademark of and sold by Hoover Universal Corporation, Ann Arbor, Mich.) blow molding machine. The relationships between die swell percent and photo flare and pinch-off width are shown in FIGS. 2 and 3, respectively. The DSP test predicts the critical flare swell behavior of a resin over a very wide range. FIGS. 4 and 5 show that the DSP test also has a high correlation with the flare swell/weight swell test. Clearly the DSP test correlates well with both the flare swell/weight swell test and the Uniloy machine blow molding processing parameters. As a result, the DSP test can closely monitor flare swell and provide an objective test for comparing flare swell results. The DSP test thus serves as a "nexus" for rheological tests which are more complicated to carry out, and provides a gauge for these rheological properties.

Normally, the extrudability of a resin declines as the melt index declines. That is, a material becomes more difficult to push through an extruder as it becomes more viscous (represented by lower melt index). Surprisingly, we have found that when the melt index is lowered by treatment with peroxide that the opposite is true; specifically, we have found that the extrusion rate generally increases as the melt index goes down as a result of peroxide treatment as illustrated in FIG. 6. We believe that a low concentration peroxide treatment changes the molecular weight distribution in a beneficial way so that the material extrudes more easily at higher shear rates. Most intermittent extrusion blow molding equipment, such as Uniloy blow molding equipment, extrudes the resin at very high shear rates. The addition of very low levels of long chain branching changes the flow of the resin through high shear zones, making it more easily extrudable.

Peroxides are well known free radical crosslinking agents and can produce resin which is so extensively crosslinked that it is essentially unextrudable; at this point, the extrusion rate has dropped to zero. Clearly, the extrusion rate declines well before such extensive crosslinking occurs. Because the addition of sufficient peroxide will reduce extrusion rate (eventually to zero) and because the initial addition of free radicals appears to increase the extrusion rate, the curve describing the dependence of the blow molding extrusion rate of resin on the level of free radicals added during compounding must contain a maximum. For peroxides, this maximum is believed to lie between 10 and 1,000 weight-ppm active oxygen, or for example, about 45 and 4,500 weight-ppm of 2,5-dimethyl2,5-di(t-butylperoxy)hexane. The maximum can occur at a higher peroxide level for some peroxides.

Another surprising result is the expansion factor ratios and the modified expansion factor ratios that are obtained are much lower than one might have expected from the prior art, as exemplified by U.S Pat. No. 4,390,666. Using a solvent with the trivial name of dioctyladipate, which is actually di-(2-ethylhexyl)adipate, most of the materials could be dissolved in this EHA, but only at a higher temperature (160°–165° C.). When the temperature was then lowered to 145° C. to measure viscosity, the polymer would generally precipitate out of solution, preventing the solution viscosity from being determined. Consistent solution viscosity results could be obtained dissolving the polymer in the di-(2-ethylhexyl)adipate at 160°–165° C., then carry out the viscosity measurement at 165° C. Expansion factor ratios obtained using this method are referred to as "modified expansion factor" ratios.

An increase in the expansion factor ratio is not needed to obtain useful processing modifications. Desirable reductions in flare swell can be achieved with very small changes in the expansion factor ratio. Flare swell reduction of the resin have been achieved with small accompanying reductions in the expansion factor ratio. That the observed expansion factor ratios remain small while beneficial changes are obtained is surprising based on the prior art. The desirable flare swell reduction can be obtained without disturbing the weight swell of the resin. At these low levels, the effect of free radical induced branching appears to result in different changes than obtained at higher free radical levels.

While certain embodiments and details have been shown for the purpose of illustrating this invention, it will be apparent to those skilled in this art that various changes and modifications may be made herein without deviating from the spirit or the scope of the invention.

We claim:

1. A polyethylene composition obtained by lightly branching a Ziegler-catalyst produced resins composition comprising
   a. From 40 to 90 weight percent of a low molecular weight component (L-MW) having a viscosity average molecular weight of from about 10,000 to about 100,000.
   b. From 10 to 60 weight percent of a high molecular weight component (H-MW) selected from the group consisting of
      (1) A high molecular weight component (HMW) having a viscosity average molecular weight of from about 200,000 to about 900,000 or
      (2) A mixture of medium and high molecular weight components comprising
         (a) A medium molecular weight component (M-MW) having a viscosity average molecular weight of from about 75,000 to about 590,000 and
         (b) A very high molecular weight component (VH-MW) having a viscosity average molecular weight, of from about 600,000 to about 900,000, wherein the viscosity average molecular weight ratio of $$\frac{VH - MW}{M - MW} \text{ is } \geq 1.7$$

wherein the total resin has a density of from about 0.940 to about 0.970 g/cc and a melt index under 2.16 kilogram load of from about 0.01 to about 2.0, wherein the ratio of the expansion factor before lightly branching ($E_1$) to the expansion factor after lightly branching ($E_2$) is $E_2/E_1$ and is $<1.08$, wherein $E_1$ and $E_2$ are determined by $E=(\eta)$ DCL/$(\eta)$ EHA wherein $(\eta)$ DCL is intrinsic viscosity in decalin at 135° C. and $(\eta)$ EHA is intrinsic viscosity in ethyl hexyl adipate at 165° C., and wherein said light branching is carried out by combining said resins with materials imparting free radicals and heating said combination at a temperature and for a time sufficient to impart die swell reduction of at least 2 percent based on the die swell of the unbranched resin when measured at a shear rate of 4125 sec$^{-1}$.

2. The composition of claim 1, wherein the low molecular weight component comprises from 60 to 90 weight percent of the composition and the high molecular weight component comprises from 10 to 40 percent of the composition.

3. The composition of claim 2 wherein $E_2/E_1$ ranges from 0.85 to 1.06.

4. The composition of claim 3 wherein the high molecular weight component consists of a mixture of medium (M-MW) and very high molecular weight (VH-MW) components such that:
   a. The very high molecular weight (VH-MW) component comprises 12-25 percent by weight of the total resin, and
   b. The medium molecular weight component (MMW) comprises 12 to 14 percent by weight of the total resin.

5. The composition of claim 4 in which the VH-MW component has a viscosity average molecular weight in the range of about 660,000 to about 775,000.

6. The composition of claim 5 wherein the VH-MW component comprises about 16 to 22 percent by weight of the total resin.

7. The composition of claim 6 wherein the M-MW component comprises about 15 to 35 percent by weight of the total resin.

8. The composition of claim 7 wherein the M-MW component comprises 18 to 22 percent by weight of the total resin.

9. The composition of claim 8 in which the comonomer or comonomers are place predominantly in the M-MW and VHMW components.

10. The composition of claim 9 in which substantially all comonomer or comonomers are placed in the VH-MW component.

11. The composition of claim 11 wherein active oxygen is present at levels up to about 200 ppmw based on the total resin present.

12. The composition of claim 11 wherein active oxygen is present at levels up to 50 ppmw.

13. The composition of claim 12 wherein active oxygen is present at levels of from about 10 to 20 ppmw.

14. A method for preparing blow molding polyethylene resins comprising lightly branching a Ziegler-catalyst produced resin containing:
   a. From 40 to 90 weight percent of a low molecular weight component (L-MW) having a viscosity average molecular weight of from about 10,000 to about 100,000.
   b. From 10 to 60 weight percent of a high molecular weight component selected from the group consisting of
   (1) A high molecular weight component (HMW) having a viscosity average molecular weight of from about 200,000 to about 900,000 or
   (2) A mixture of medium and high molecular weight components comprised of
      (a) A medium molecular weight component (M-MW) having a viscosity average molecular weight of from about 75,000 to about 590,000 and
      (b) A very high molecular weight component (VH-MW) having a viscosity average molecular weight of from about 700,000 to about 900,000, wherein the viscosity average molecular weight ratio of $$\frac{H\text{-}MW}{M\text{-}MW} \text{ is } = 1.7$$

wherein the total resin has a density of from about 0.940 to about 0.970 and a melt index under 2.16 kilogram load of from about 0.01 to about 2.0, wherein the ratio of the expansion factor before lightly branching ($E_1$) to the expansion factor after lightly branching ($E_2$) is $E_2/E_1$ and is $<1.06$, wherein $E_1$ and $E_2$ are determined by $E=(\eta)$ DCL/ $(\eta)$ EHA wherein $(\eta)$ DCL is intrinsic viscosity in decalin at 135° C. and $(\eta)$ EHA is intrinsic viscosity in ethyl hexyl adipate at 165° C., and wherein said light branching is carried out by combining said resins with materials capable of imparting free radicals and heating said combination at a temperature and for a time sufficient to impart a die swell reduction of at least 2 percent when measured at 4125 sec$^{-1}$, based on the die swell of the unbranched resin, then using the resin in a blow molding application.

15. A method of claim 14 wherein the high molecular weight components consists of a mixture of medium (M-MW) and very high molecular weight (VH-MW) components such that:
   a. The very high molecular weight (VH-MW) component comprises 12-25 percent by weight of the total resin, and
   b. The medium molecular weight (M-MW) component comprises 12 to 40 percent by weight of the total resin, and
   c. A low molecular weight component (L-MW) comprises the balance of the resin.

16. A method according to claim 15 wherein the M-MW component comprises about 15-32 percent by weight of the total resin.

17. A method according to claim 16 wherein the M-MW component comprises about 16-22 percent by weight of the total resin.

18. A method according to claim 15 wherein one or more comonomers are placed predominantly in the M-MW and VH-MW fractions.

19. A method according to claim 15 wherein one or more comonomers are placed predominantly in the VH-MW fraction.

20. The method of claim 14 wherein the branching occurs in-situ by addition of from about 10 ppmw to about 200 ppmw active oxygen to the resin during blow molding.

21. Blow molded objects produced using the method of claim 14.

* * * * *